United States Patent [19]

Macrae

[11] 3,905,070
[45] Sept. 16, 1975

[54] CONTROL CABLE CLIP
[75] Inventor: Ralph Macrae, Burlington, Canada
[73] Assignee: Eaton Corporation, Cleveland, Ohio
[22] Filed: Nov. 4, 1974
[21] Appl. No.: 520,197

[52] U.S. Cl. ............................ 24/81 CR; 403/400
[51] Int. Cl.² ......................................... A44B 21/00
[58] Field of Search ................... 403/400, 346, 207; 24/81 B, 81 CR, 71.3

[56] References Cited
UNITED STATES PATENTS

| | | |
|---|---|---|
| 516,291 | 3/1894 | Aylworth et al. .......... 24/81 CR UX |
| 581,145 | 4/1897 | Watkins .............................. 403/207 |
| 687,322 | 11/1901 | Leslie ................................. 403/207 |
| 2,137,618 | 11/1938 | Krimmel ....................... 24/71.3 UX |
| 2,523,785 | 9/1950 | Sereno ............................. 24/81 CR |
| 3,819,290 | 6/1974 | Plotkin .......................... 403/400 X |

FOREIGN PATENTS OR APPLICATIONS 867,114 5/1961 United Kingdom ................ 24/81 B

*Primary Examiner*—Donald A. Griffin
*Attorney, Agent, or Firm*—Teagno & Toddy

[57] ABSTRACT

A clip is provided for self-retention to a controlled rod or the like and for self-adjustable retention of a control cable such as a Bowden wire. The clip comprises a one-piece body, preferably a spring steel stamping, having a pair of spaced apart parallel, elongated tabs for retention of the control cable and also having a controlled rod retaining member such as a pair of flanges designed to self-retainingly receive the controlled rod therebetween. Each tab has one end thereof attached to the body of the clip and an opposite free end, the free ends of the tabs extending in opposite directions. The tabs are spaced from, and extend generally parallel to, a generally flat side of the body. The body of the clip is formed with a plurality of convolutions extending towards the tabs and the tabs may be arcuate in cross-section, convex sides towards the body, to present a plurality of rounded surfaces between which the control cable is self-adjustably retained. The clip is designed to allow the inner control wire of the control cable to slip relative to the clip upon the application of a predetermined axial force on the control wire relative to the clip.

11 Claims, 6 Drawing Figures

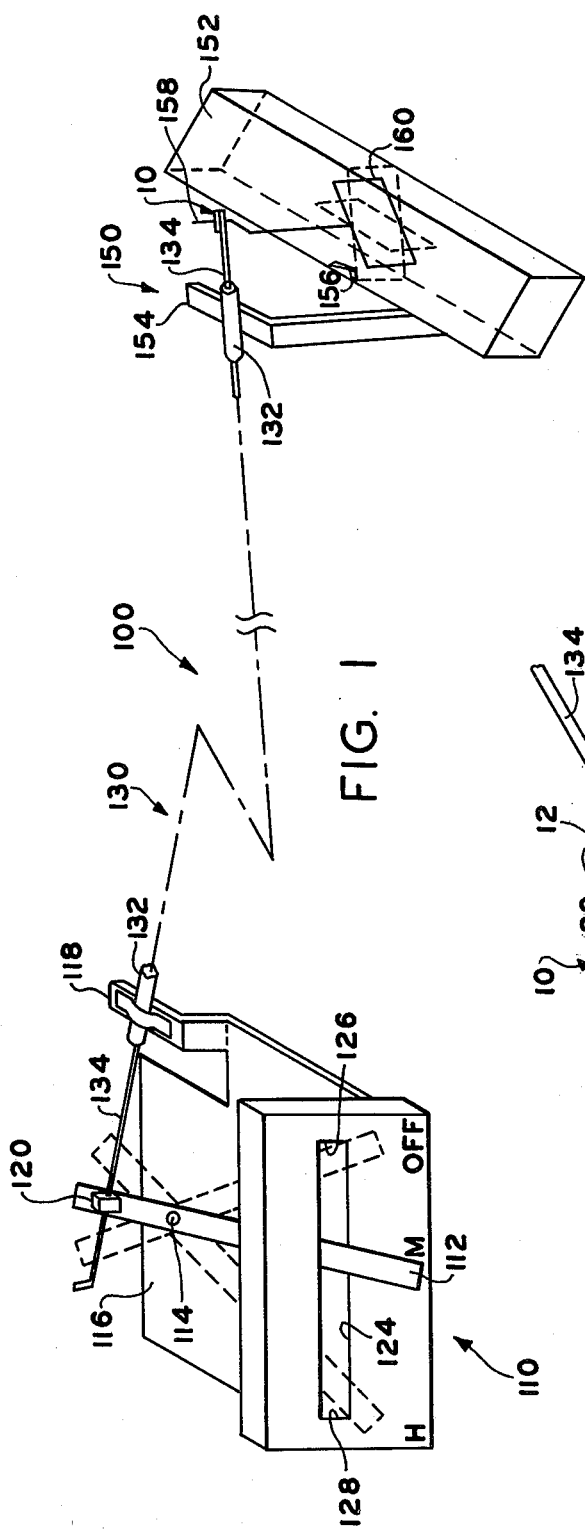
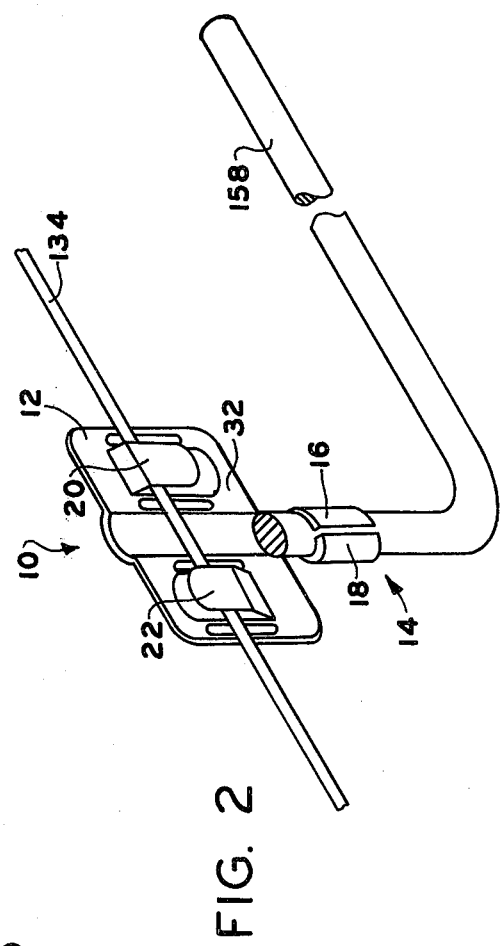
FIG. 1
FIG. 2

CONTROL CABLE CLIP

BACKGROUND OF THE INVENTION

1. Field of the Invention

This invention relates to clips for control cables and more particularly relates to clips for self-retention on a controlled member, such as a controlled rod, and for self-adjustable retention of the inner control wire of a flexible control cable or Bowden wire.

2. Description of the Prior Art

The use of flexible control cables, such as Bowden wires, to control a remote device by movement of a control lever or handle, such as may be seen by reference to U.S. Pat. No. 3,486,397, is well known in the art. In such cases, it is often important to attach the control cable to the controlled device such that the positions of the control lever correspond correctly to the desired positions of the controlled device. For example, it is important in an automotive air-conditioner, defroster and/or heater system that placing the control lever in the "Off" position will result in a corresponding complete closure of the corresponding remotely controlled damper door. In the past, attaching the control cable to the controlled device and adjusting the cable to properly coordinate the control lever and the controlled device has been a complicated and time-consuming operation. To simplify this task, various types of adjustable control cable clips have been developed.

The prior art adjustable control cable clips were generally either complicated, multi-piece structures such as may be seen in U.S. Pat. Nos. 3,752,008 and 3,546,962 or utilized jaws having sharp edges thereon to penetrate or bite into and permanently engage the control wire after a single adjustment as may be seen by reference to U.S. Pat. No. 3,513,718.

The prior art multi-piece structures were not totally satisfactory for lighter duty applications, such as controlling damper doors on automotive air-conditioners, heaters, defrosters and the like, because they were relatively complicated and expensive to produce and often required assembly time to properly coordinate the remote control with the controlled device. The devices utilizing biting or penetrating jaws were not totally satisfactory in situations requiring possible re-adjustment of the controlled device relative to the control cable.

SUMMARY OF THE INVENTION

In accordance with the present invention, the drawbacks of the prior art have been overcome to the extent that a relatively simple and inexpensive, one-piece clip for self-retention to a controlled rod or the like and for self-adjustable retention of a flexible control cable has been provided. The above is accomplished by utilizing a onepiece body, preferably a spring steel stamping, having a controlled rod retention means and a pair of spaced-apart, parallel, elongated tabs for retention of the control cable. The tabs are attached at one end thereof to the body and have an opposite free end, the free ends of the tabs extending in opposite directions. The tabs are spaced from, and extend generally parallel to, one side of the body to retainingly receive the control cable between the one side of the body and the tabs. The body has a plurality of rounded convolutions extending towards the tabs and the tabs have an arcuate cross-section, convex side towards the body, to provide a plurality of rounded, non-penetrating opposed surfaces to self-adjustably receive and retain the control wire. The clip is designed to allow relative movement between the clip and the control wire upon the application of a predetermined axial force therebetween.

In operation, the clip is attached to the inner control wire of a control cable by placing the control wire at the oppositely extending free ends of the tabs and then applying a rotating motion to the clip relative to the wire. The controlled rod is placed in a desired position, such as a position closing the damper door of a defroster or a heater, and then the remote control handle is pulled, at a force allowing the control cable to move relative to the clip, until the control handle is at a position correctly corresponding to the position of the controlled device. The clip of the present invention thus allows for the simple, self-attachment and adjustment of a control cable to a remotely controlled device.

Accordingly, it is an object of the present invention to provide a relatively simple and inexpensive clip for self-adjustably attaching a control cable, or Bowden wire, to a controlled rod or the like.

It is further an object of the present invention to provide a one-piece clip for self-retention to a controlled device and for self-adjustable retention of the inner control wire of a flexible control cable such as a Bowden wire.

Another object of the present invention is to provide a one-piece clip for self-retention of a controlled rod or the like and having a plurality of opposed, rounded surfaces for non-penetrating, self-adjustable retention of an inner control wire of a control cable therebetween.

These and other objects and advantages of the present invention will become apparent from a reading of the detailed description of the invention taken in connection with the attached drawings.

BRIEF DESCRIPTION OF THE DRAWINGS

FIG. 1 is a schematic illustration of an automotive heater system utilizing the self-adjustable control cable clips of the present invention.

FIG. 2 is a perspective view of the control cable clip of the present invention.

DESCRIPTION OF THE PREFERRED EMBODIMENT

Figure 3:
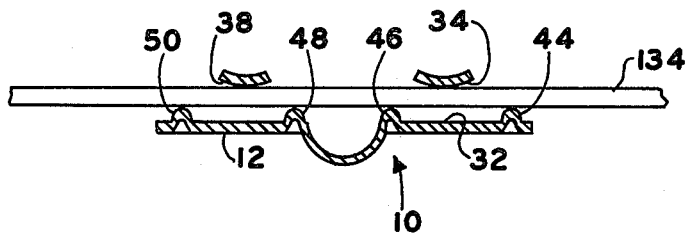
FIG. 3 is a cross-sectional view of the clip of the present invention as assembled to a control cable.
Figure 4:
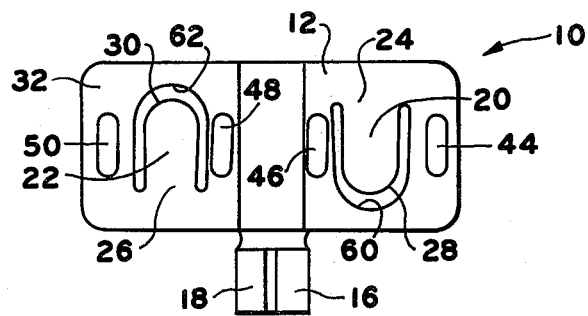
FIG. 4 is a front elevational view of the clip of the present invention.
Figure 5:
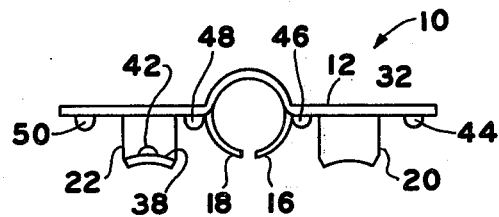
FIG. 5 is a top view of the clip illustrated in FIG. 4.

A typical system utilizing the control cable clip 10 of the present invention is illustrated in FIG. 1 which is a schematic view of an automotive heater system control mechanism 100. It is understood that the clip 10 of the present invention is suitable for various relatively light duty applications requiring the attachment of a Bowden wire type of control cable to a controlled or actuated device such as the damper door of an automotive air-conditioning system, an automotive defroster, an automotive hood release and the like. The term "light duty" as used herein is understood to mean applications requiring less than approximately 10–12 pounds of actuation force and is intended to specifically exclude such applications as automotive brake actuation, parking brake actuation and the like.

Referring to FIG. 1, an automotive heater system control mechanism 100 is schematically illustrated and includes a control 110, a flexible control cable or Bowden wire 130, and a remote controlled device 150, in this case a heater duct 152 having a remotely controlled damper door 160.

The control 110 includes a control lever or handle 112 pivotally mounted at 114 to the frame 116 of the control. The frame 116 includes means at 118 for mounting the outer sheath 132 of the flexible, push-pull control cable 130. The axially movable, inner control wire 134 of the control cable 130 is attached to the end 120 of the control lever 112 for movement therewith. The control lever 112 may be selectively pivotally moved to an "Off," "M(Medium)" or "H(High)" position intended to correspond to closed, half-open and full-open positions respectively of damper door 160. The control lever 112 is slidably received within slot 124 of the control frame 116 and its pivotal movement is limited by the ends 126 and 128 of the slot.

The remote controlled device 150 is a heater duct 152 having a selectively openable damper door 160. The duct 152 includes a member 154 for mounting the outer sheath 132 of the control cable 130. The damper door 160 is pivotally mounted as at 156 to the duct. A controlled rod 158 is mounted to the free end of the damper door 160 at one end thereof and is attached to the control wire 134 at the other end thereof. The control cable clip 10 of the present invention is utilized to attach the control wire 134 to the end of the controlled rod.

In operation, the position of the damper door 160 is remotely controlled by movement of the control lever 112 which causes axial movement of the control wire 134 relative to the heating duct 152, which in turn causes movement of controlled rod 158 pivotally opening or closing the damper door 160.

The clip 10 of the present invention may be seen in greater detail by reference to FIGS. 2–5. In FIG. 2, the clip 10 is perspectively illustrated as self-retainingly mounted to the free end of the controlled rod 158 and as self-adjustably retaining inner control wire 134 of the control cable 130.

The clip 10 comprises a one-piece body 12, which in the preferred embodiment is a spring steel stamping, but it may also be a molded plastic part or the like. The body 12 includes a member 14 to self-retainingly mount the clip to the controlled member. In the illustrated preferred embodiment member 14 includes a pair of semi-annularly formed flanges, 16 and 18, which are adapted to self-retainingly receive the controlled rod 158 therebetween. Various other types of self-retaining members may, of course, be utilized.

The body 12 also includes a pair of spaced apart parallel, elongated tabs, 20 and 22. Each tab, 20 and 22, has one end, 24 and 26 respectively, attached to the body 12 and an opposite free end, 28 and 30 respectively. The free ends, 28 and 30, of tabs 20 and 22 extend in substantially opposite directions. The tabs are spaced from and extend generally parallel to one side, 32, of the one-piece body 12. The tabs are generally arcuate in cross-section, as may be seen by reference to FIGS. 3 and 5, with the convex surfaces, 34 and 38, thereof extending towards side 32 of the body. The convex surfaces, 34 and 38, may each have a protrusion, 40 and 42 respectively, adjacent the free ends thereof to resist removal of a control wire received between the tabs and the body as may be seen in FIG. 5. As may be seen in the preferred embodiment, the tabs may be formed from cut out portions, 60 and 62, of the spring steel body 12.

Side 32 of the body 12 has plurality of convolutions 44, 46, 48 and 50 extending therefrom towards the convex surfaces, 34 and 38, of the tabs 20 and 22. The convolutions are spaced from the convex surfaces of the tabs, in a direction normal to the surface, by a distance less than the diameter of the control wire 134 intended to be self-adjustably retained. Convolutions 44, 46, 48 and 50 are formed in the body 12, such as by cup like projections in the spring steel body as illustrated, and extend generally parallel with the tabs 20 and 22. In the preferred embodiment, see FIGS. 3, 4 and 5, the convolutions are formed in pairs, with one convolution of each pair on either side of the cut out portions, 60 and 62.

As may been seen in FIG. 3, when the control wire is inserted to a position between the tabs, 20 and 22, and the side 32 of body 12, the control wire is resiliently retained between two groups of three opposed rounded, nonpenetrating surfaces 44, 34, 46 and 48, 38 and 50. The tabs and convolutions may be designed to apply a selective retaining force to control wire 134.

The retaining force may, of course, be overcome by a predetermined axial force between the control wire 134 and the clip 10 to obtain relative movement between the clip and the control wire in a direction parallel to the axis of the control wire 134 at the clip. The possibility of selective, repeatable relative movement between the clip 10 and the control wire 134 allows the clip 10 to be utilized for repeated self-adjustable attachment of the control wire 134 to the controlled rod 158 in a manner to be discussed below. In practice, it has been found that for most automotive airconditioning, heating and/or defrosting systems, a satisfactory attachment and self-adjustment will be provided if the clip 10 will retain the control wire until greater than 6–10 pounds of axial force is applied to the wire relative to the clip 10.

In operation, the attachment of the control wire to the controlled device and self-adjustment of the control wire is achieved by utilizing the control cable clip of this invention in the following manner. The control wire 134 is placed at the free ends of tabs 20 and 22. The clip 10 is then rotated in a clockwise direction relative to the wire 134 to force the control wire past protrusions 40 and 42 and into a position between the convex surfaces of the tabs, 34 and 38, and the convolutions 44, 46, 48 and 50 of the body whereat the control wire is retained. In this example, the clip 10 is attached to the control wire 134 at a position significantly closer to the end of the wire attached to control lever 112 than is desirable for proper coordination of the control lever 112 and the controlled rod 158 of the damper door 160. The controlled rod retaining member 14 is then self-retainingly placed over the free end of controlled rod 158. Lever 112, which has been in the "H(High)" position, is then moved until movement of control wire 134 causes damper door 160 to close against the duct 150 precluding further movement of the damper door and the controlled rod 158. The lever 112, is then further moved, at greater than the predetermined force, causing the control wire to move relative to the clip 10 and controlled rod 158 until further movement of the lever 112 is precluded by engagement of lever with the stop located at the "Off" position of the control frame 116. The stop is comprised of the end 126 of slot 124. Slot 126 is of a length such that pivotal movement of lever 112 between the "Off" and "H(High)" positions will result in the desired corresponding pivotal movement of remotely controlled damper door 160. Due to the rounded, non-biting, non-penetrating surfaces 44, 34, 46, 48, 38 and 50 engaging the control wire 134, use of clip 10 allows the control wire to be repeatedly self-adjusted relative to the controlled rod 158.

Figure 6:
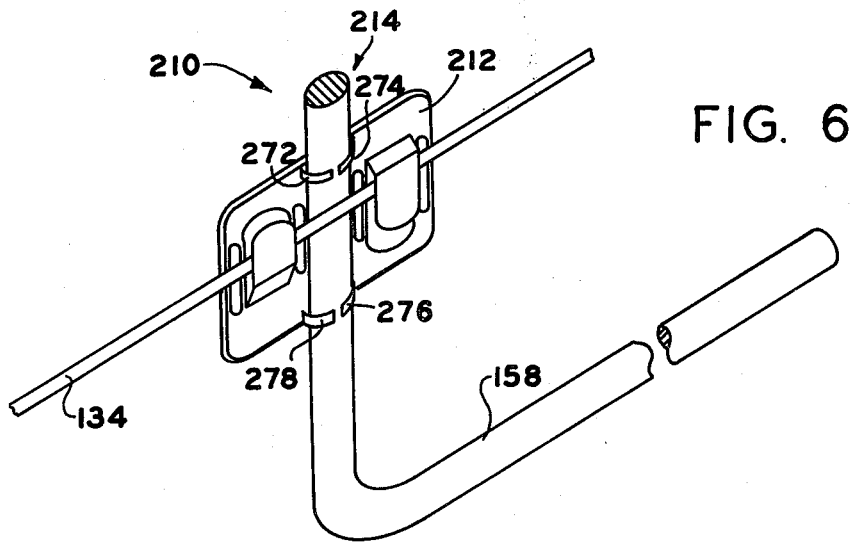
FIG. 6 is a perspective view of an alternate embodiment of the present invention.

An alternate embodiment of the present invention may be seen by reference to FIG. 6. In FIG. 6 a control cable clip 210 is illustrated which is substantially identical to previously described clip 10 except for the controlled rod retaining member 214. The controlled rod 158 retaining member 214 comprises a concave depression 270 in body 212 and a plurality of spring fingers 272, 274, 276 and 278 which form, in combination with depression 270, a controlled rod receiving cavity.

It may be seen from the above description of the preferred embodiments that the control cable clip of the present invention provides an improved, relatively simple and economically produced means of self-adjustably attaching a control wire to a controlled device which is suitable for repeated attachments and self-adjustments, if necessary.

Although this invention has been described in its preferred form with a certain degree of particularity, it is understood that the present disclosure of the preferred form has been made by way of example only and that numerous changes in the details of construction and combination and arrangement of the parts may be resorted to without departing from the spirit and the scope of the invention as hereinafter claimed.

I claim:

1. A one-piece clip for self-adjustably mounting the inner control wire of a control cable to a controlled device, said clip comprising a substantially flat body having a controlled device retaining means thereon, a pair of spaced apart, parallel elongated tabs formed in said body, said tabs being spaced from and extending generally parallel to one side of said body, each of said tabs having a smooth, curved surface extending towards said one side of said body, said one side of said body having at least one convolution formed therein presenting a convex surface extending generally parallel to and towards said tabs, said convex surface and said curved surfaces of said tabs being separated by a distance measured normally to said one side, which is less than the diameter of said control wire to be retained, said convex surface and said curved surfaces of said tabs providing a plurality of rounded, non-penetrating, opposed surfaces for retention of said control wire.

2. The one-piece clip of claim 1 wherein said tabs are generally arcuate in cross-section and said smooth surfaces comprise the convex sides of said tabs extending towards said one side of said body.

3. The clip of claim 2 wherein each of said tabs has an end attached to said body and a free end, said free ends extending in substantially opposite directions.

4. The clip of claim 3 wherein said controlled device is a controlled rod and said retaining means is a plurality of flanges together forming a controlled rod receiving and retaining cavity.

5. The clip of claim 3 wherein each of said tabs includes a protrusion extending from said convex surface adjacent said free ends of said tabs.

6. The clip of claim 3 wherein said one side of said body includes two pairs of convolutions, each pair being located generally opposite a tab with one convolution to either side the opposed tab.

7. The clip of claim 6 wherein said body is a spring steel stamping, said tabs are formed from cut out portions of said stamping and said convolutions are generally parallel to and adjacent the sides of said cut out portions.

8. A one-piece, spring steel clip for self-adjustably mounting the inner control wire of a control cable to one end of a remotely controlled rod, said clip comprising a generally flat stamped body having a pair of flanges forming a cavity therebetween to self-retainingly receive said one end of said remotely controlled rod, a pair of spaced apart, parallel elongated tabs formed from cut out portions of said body, said tabs being spaced from and extending generally parallel to one side of said body, said tabs being generally arcuate in cross-section with the convex sides thereof extending towards said one side of said body, said tabs having one end thereof attached to said body and a free end, said free ends of said tabs extending in opposite directions, said one side of said body having two pairs of convolutions formed therein each presenting a convex surface towards said convex side of said tabs, one convolution of each pair being adjacent and parallel to each side of said cut out portions of said body, said convex side of said tabs and said convex surfaces being separated by a distance measured normal to said one side of said body less than the diameter of the control wire, said convex surfaces and convex sides of said tabs presenting a plurality of rounded, non-penetrating opposed surfaces for retention of said control wire therebetween.

9. The clip of claim 8 wherein said convex surfaces of said tabs have protrusions extending therefrom adjacent the free ends of said tabs.

10. The clip of claim 9 wherein said convex surfaces and said convex sides of said tabs are separated by a distance which will allow said convex sides and convex surfaces to apply a compressive retaining force on a control wire received therebetween sufficient to resist no greater than a predetermined axial force on said control wire relative to said clip.

11. The clip of claim 10 wherein said predetermined axial force is in the range of 6–10 pounds.

* * * * *